United States Patent

Parker

[11] Patent Number: 5,862,625
[45] Date of Patent: Jan. 26, 1999

[54] EXPANDABLE-PORTABLE TRELLIS SYSTEMS WITH HYDRO APPLICATION

[76] Inventor: Barbara A. Parker, 2429 E. Loyola Dr., Tempe, Ariz. 85282-4165

[21] Appl. No.: 936,947

[22] Filed: Sep. 25, 1997

[51] Int. Cl.$^6$ .................................................. A01G 17/06
[52] U.S. Cl. .................................................. 47/47; 47/70
[58] Field of Search .......................... 47/47, 70; 134/171; 277/603; 285/125.1, 179

[56] References Cited

U.S. PATENT DOCUMENTS

| | | | |
|---|---|---|---|
| H824 | 10/1990 | Ghafoorzai | 47/70 |
| D. 172,500 | 6/1954 | Gurmin | 47/70 |
| 2,839,320 | 6/1958 | Hill | 285/125.1 |
| 3,875,699 | 4/1975 | Lamarre | 47/47 |
| 5,335,448 | 8/1994 | Martinez et al. | 47/47 |
| 5,564,756 | 10/1996 | Hamilton | 277/603 |
| 5,775,736 | 7/1998 | Svetlik | 285/179 |

*Primary Examiner*—Michael J. Carone
*Assistant Examiner*—Elizabeth Shaw

[57] ABSTRACT

An expandable water trellis is provided including a plurality of hollow pipes of various lengths each having a pair of open ends and a plurality of linearly aligned water dispensers formed along a length thereof. Upon the flow of water within the pipe, water is dispensed through the dispensers for watering purposes. Also included is a plurality of caps each defined by a closed circular face with a periphery coupled thereto for defining an open top for removably securing about one of the open ends of one of the hollow pipes for selectively sealing the same. Next provided is a plurality of T-shaped interconnects each formed of a long tube with a pair of open ends and a short tube integrally coupled to a central extent of the long tube and extending perpendicularly therefrom thereby terminating in an open end which resides in fluidic communication with the open ends of the long tube. Each of the open ends is adapted to be releasably coupled to one of the open ends of one of the pipes in fluidic communication therewith. A plurality of elastomeric stoppers are defined by a portion of a cylinder. Each stopper is adapted to be removably situated within the open ends of the pipes for precluding the flow of water therethrough. A water source connector is included for releasaby connecting to a water source, whereby the water connector is releasably coupleable with the interconnects for supplying a water flow to the pipes.

8 Claims, 3 Drawing Sheets

5,862,625

EXPANDABLE-PORTABLE TRELLIS SYSTEMS WITH HYDRO APPLICATION

BACKGROUND OF THE INVENTION

1. Field of the Invention

The present invention relates to trellis systems and more particularly pertains to a new expandable-portable trellis systems with hydro application for constructing trellis structures of various sizes and shapes for encompassing a garden to water the same.

2. Description of the Prior Art

The use of trellis systems is known in the prior art. More specifically, trellis systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art trellis systems include U.S. Pat. No. 5,357,710; U.S. Des. Pat. No. 305,800; U.S. Des. Pat. No. 304,700; U.S. Des. Pat. No. 246,860; U.S. Pat. No. 4,048,752; and U.S. Pat. No. 4,869,018.

In these respects, the expandable-portable trellis systems with hydro application according to the present invention substantially departs from the conventional concepts and designs of the prior art, and in so doing provides an apparatus primarily developed for the purpose of constructing trellis structures of various sizes and shapes for encompassing a garden for watering the same.

SUMMARY OF THE INVENTION

In view of the foregoing disadvantages inherent in the known types of trellis systems now present in the prior art, the present invention provides a new expandable-portable trellis systems with hydro application construction wherein the same can be utilized for constructing trellis structures of various sizes and shapes for encompassing a garden for watering the same.

The general purpose of the present invention, which will be described subsequently in greater detail, is to provide a new expandable-portable trellis systems with hydro application apparatus and method which has many of the advantages of the trellis systems mentioned heretofore and many novel features that result in a new expandable-portable trellis systems with hydro application which is not anticipated, rendered obvious, suggested, or even implied by any of the prior art trellis systems, either alone or in any combination thereof.

To attain this, the present invention generally comprises a plurality of hollow pipes of various lengths. Each has a pair of open ends and a plurality of linearly aligned water dispensers formed along a length thereof. Upon the flow of water within the pipe, water is dispensed through the dispensers for watering purposes. As shown in FIG. 1, a plurality of caps are each defined by a closed circular face with a periphery coupled thereto for defining an open top. Each cap is adapted for removably securing about one of the open ends of one of the hollow pipes for selectively sealing the same. With attention still to FIG. 1, it is shown that a plurality of T-shaped interconnects are provided. Such T-shaped interconnects are each formed of a long tube with a pair of open ends. A short tube is integrally coupled to a central extent of the long tube and extends perpendicularly therefrom. It should be noted that the short tube terminates in an open end which resides in fluidic communication with the open ends of the long tube. Another interconnect is provided with a cross-shaped configuration. These interconnects are each formed of a pair of tubes having a pair of open ends. The pair of tubes are integrally and perpendicularly coupled at central extents thereof with the open ends thereof in fluidic communication. Further provided is a plurality of 45 and 90 degree angle interconnects including a single tube with a pair of open ends. Each 45 and 90 degree angle interconnect is defined by a first extent and a second extent situated about an axis which resides at a 45 and 90 degree angle with respect to an axis encompassed by the first extent, respectively. Each of the open ends of any of the interconnects of the present invention is adapted to be releasably coupled to one of the open ends of one of the pipes in fluidic communication therewith. As shown in FIG. 6, a plurality of elastomeric stoppers are defined by a portion of a cylinder. During use, each stopper is adapted to be removably situated within the open ends of the pipes for precluding the flow of water therethrough. FIG. 2 shows a water source connector including a short tube having a pair of open ends. An annular flange is integrally coupled to the tube adjacent one of the open ends thereof and extends radially outwardly therefrom. A sleeve having a hollow cylindrical configuration is provided with an annular lip integrally coupled to an end thereof and extending radially inward. A plurality of threaded protrusions are formed in an interior surface thereof. The sleeve is rotatably coupled to the short tube of the water source connector for releasaby connecting to a water source. During use, the short tube is releasably coupleable with the interconnects for supplying a water flow to the pipes.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new expandable-portable trellis systems with hydro application apparatus and method which has many of the advantages of the trellis systems mentioned heretofore and many novel features that result in a new expandable-portable trellis systems with hydro application which is not anticipated, rendered obvious, suggested, or even implied by any of the prior art trellis systems, either alone or in any combination thereof.

It is another object of the present invention to provide a new expandable-portable trellis systems with hydro application which may be easily and efficiently manufactured and marketed.

It is a further object of the present invention to provide a new expandable-portable trellis systems with hydro application which is of a durable and reliable construction.

An even further object of the present invention is to provide a new expandable-portable trellis systems with hydro application which is susceptible of a low cost of manufacture with regard to both materials and labor, and which accordingly is then susceptible of low prices of sale to the consuming public, thereby making such expandable-portable trellis systems with hydro application economically available to the buying public.

Still yet another object of the present invention is to provide a new expandable-portable trellis systems with hydro application which provides in the apparatuses and methods of the prior art some of the advantages thereof, while simultaneously overcoming some of the disadvantages normally associated therewith.

Still another object of the present invention is to provide a new expandable-portable trellis systems with hydro application for constructing trellis structures of various sizes and shapes for encompassing a garden for watering the same.

Even still another object of the present invention is to provide a new expandable-portable trellis systems with hydro application that includes a plurality of hollow pipes of various lengths each having a pair of open ends and a plurality of linearly aligned water dispensers formed along a length thereof. Upon the flow of water within the pipe, water is dispensed through the dispensers for watering purposes. Also included is a plurality of caps each defined by a closed circular face with a periphery coupled thereto for defining an open top for removably securing about one of the open ends of one of the hollow pipes for selectively sealing the same. Next provided is a plurality of T-shaped interconnects each formed of a long tube with a pair of open ends and a short tube integrally coupled to a central extent of the long tube and extending perpendicularly therefrom thereby terminating in an open end which resides in fluidic communication with the open ends of the long tube. Each of the open ends is adapted to be releasably coupled to one of the open ends of one of the pipes in fluidic communication therewith. A plurality of elastomeric stoppers are defined by a portion of a cylinder. Each stopper is adapted to be removably situated within the open ends of the pipes for precluding the flow of water therethrough. A water source connector is included for releasaby connecting to a water source, whereby the water connector is releasably coupleable with the interconnects for supplying a water flow to the pipes.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
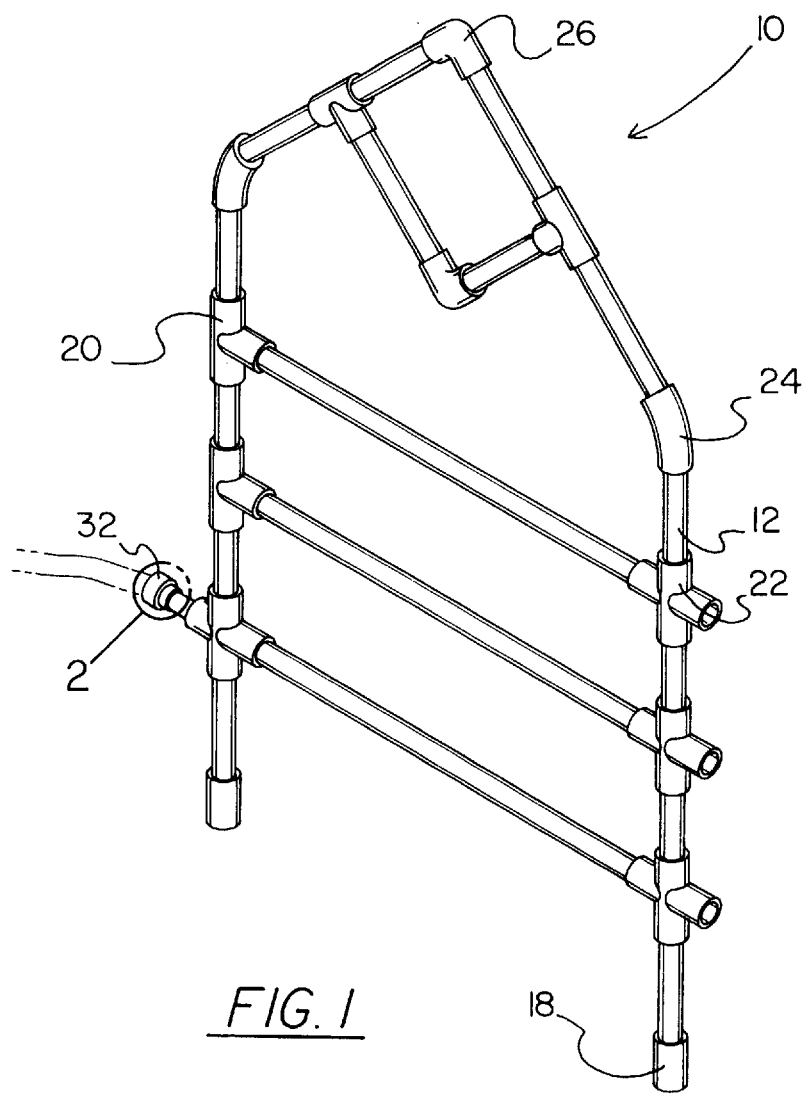
FIG. 1 is a perspective view of a new expandable-portable trellis systems with hydro application according to the present invention.

With reference now to the drawings, and in particular to FIGS. 1 through 6 thereof, a new expandable-portable trellis systems with hydro application embodying the principles and concepts of the present invention and generally designated by the reference numeral 10 will be described.

The present invention, as designated as numeral 10, includes a plurality of hollow pipes 12 of various lengths. Each has a pair of open ends 14 and a plurality of linearly aligned water dispensers 16 formed along a length thereof. Upon the flow of water within the pipe, water is dispensed through the dispensers for watering purposes. In the preferred embodiment, each pipe may have a different type of water dispenser. For example, one pipe may have a plurality of drippers, one pipe may have misters, and another pipe may have bubblers. It should be understood that the foregoing dispensers and the associated function may be accomplished by varying the size and shape of an aperture associated with each dispenser or, in the alternative, entail the employment of nozzles mounted on the pipes.

As shown in FIG. 1, a plurality of caps 18 are each defined by a closed circular face with a periphery coupled thereto for defining an open top. Each cap is adapted for removably securing about one of the open ends of one of the hollow pipes for selectively sealing the same.

With attention still to FIG. 1, it is shown that a plurality of T-shaped interconnects 20 are provided. Such T-shaped interconnects are each formed of a long tube with a pair of open ends. A short tube is integrally coupled to a central extent of the long tube and extends perpendicularly therefrom. It should be noted that the short tube terminates in an open end which resides in fluidic communication with the open ends of the long tube.

A plurality of another type of interconnect 22 is provided with a cross-shaped configuration. These interconnects are each formed of a pair of tubes having a pair of open ends. The pair of tubes are integrally and perpendicularly coupled at central extents thereof with the open ends thereof in fluidic communication.

Further provided is a plurality of 45 and 90 degree angle interconnects 24 & 26 including a single tube with a pair of open ends. Each 45 and 90 degree angle interconnect is defined by a first extent and a second extent situated about an axis which resides at a 45 and 90 degree angle with respect to an axis encompassed by the first extent, respectively.

Each of the open ends of any of the interconnects of the present invention is adapted to be releasably coupled to one of the open ends of one of the pipes in fluidic communication therewith. In the preferred embodiment, the forgoing coupling is afforded by way of friction between the pipe which has an other surface that has a smaller diameter than that of the tubes of the interconnects. Note FIG. 6. Such frictional releasable coupling further permits rotation of the pipes therein for directing water at various angles with respect to the vertical.

Figure 6:
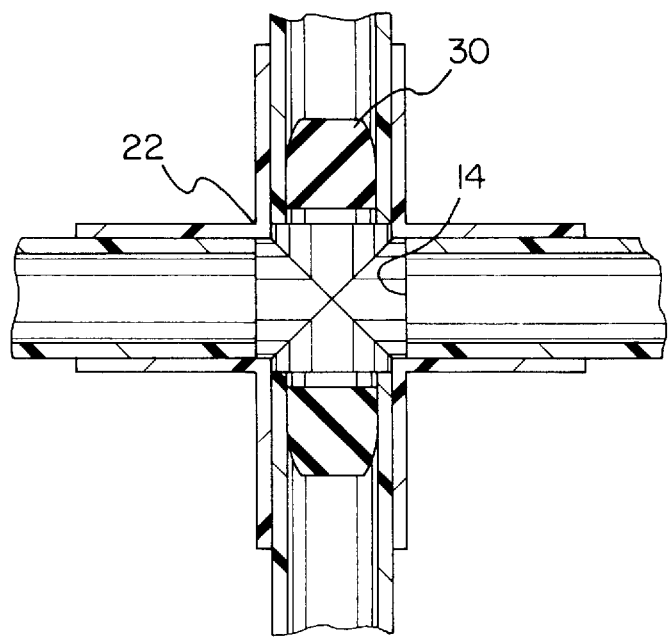
FIG. 6 is a cross-sectional view of interconnect of the present invention shown in FIG. 5.

As shown in FIG. 6, a plurality of elastomeric solid stoppers are defined by a portion of a cylinder. During use, each stopper is adapted to be removably situated within the open ends of the pipes for precluding the flow of water therethrough. As an option, each stopper may be equipped with a tab for facilitating the insertion and removal thereof from the pipes.

Figure 2:
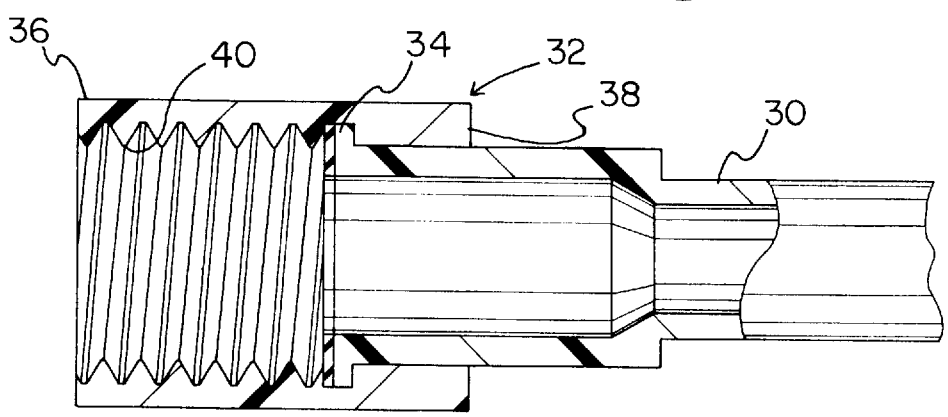
FIG. 2 is a cross-sectional view of the water source connector of the present invention.
Figure 3:
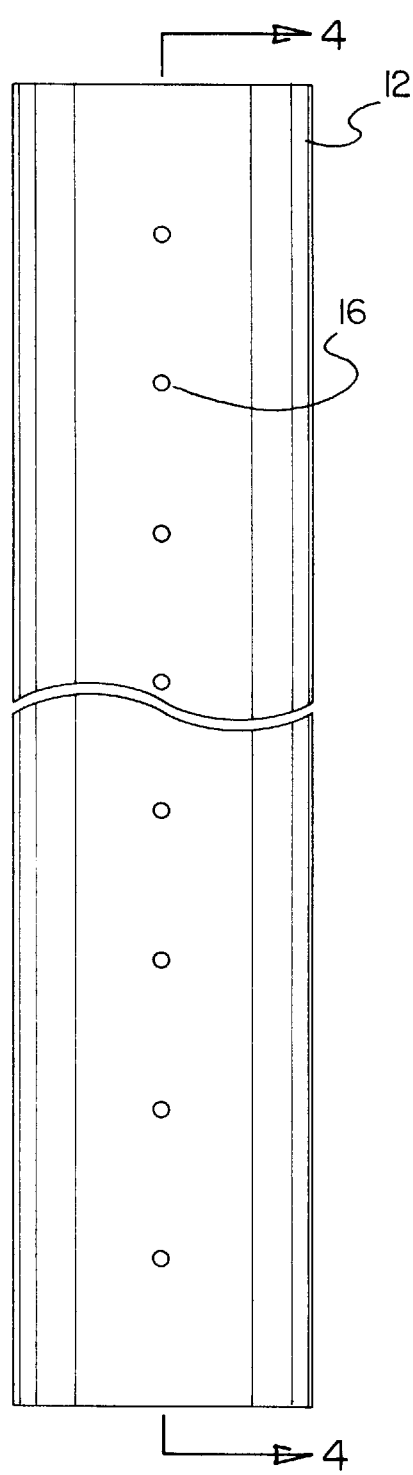
FIG. 3 is a side view of one of the pipes of the present invention.
Figure 4:
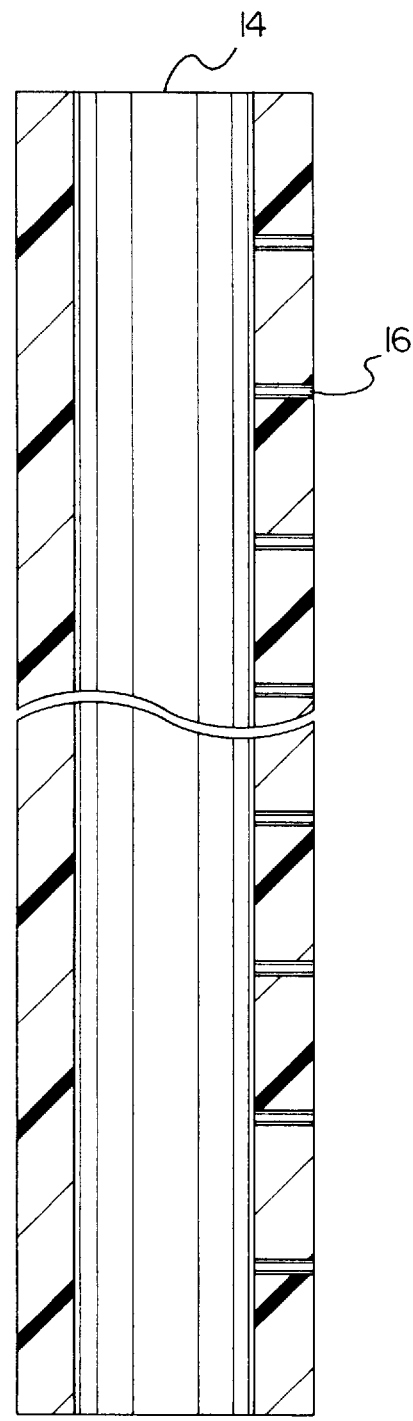
FIG. 4 is a cross-sectional view of the pipe shown in FIG. 3.
Figure 5:
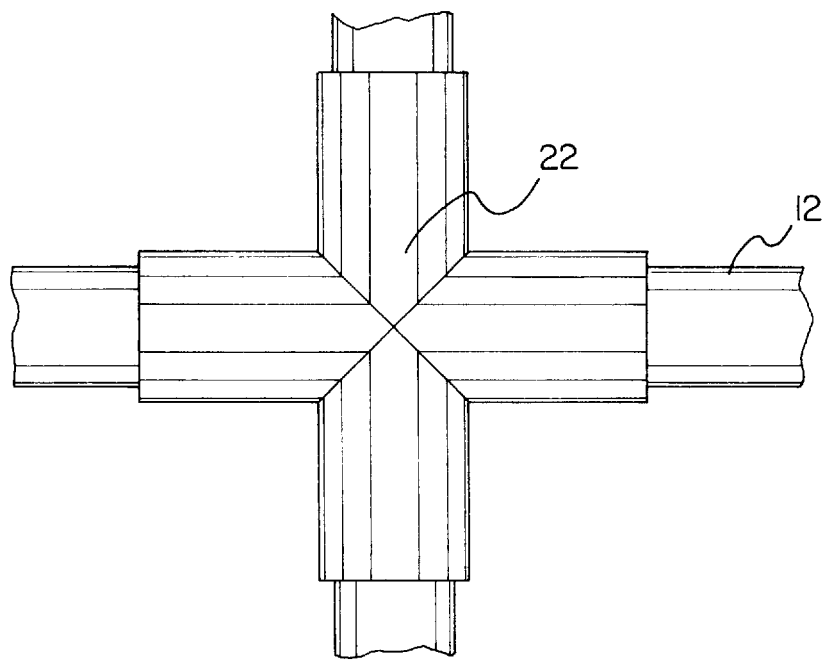
FIG. 5 is a side view of the cross-shaped interconnect of present invention.

FIG. 2 shows a water source connector 32 including a short tube 33 having a pair of open ends. An annular flange 34 is integrally coupled to the tube adjacent one of the open ends thereof and extends radially outwardly therefrom. A sleeve 36 having a hollow cylindrical configuration is provided with an annular lip 38 integrally coupled to an end thereof and extending radially inward. A plurality of threaded protrusions 40 are formed in an interior surface of the sleeve. The sleeve is rotatably coupled to the short tube of the water source connector for releasaby connecting to a water source. During use, the short tube is releasably coupleable with the interconnects for supplying a water flow to the pipes. The present form of the water source connector is specifically adapted for coupling with a garden hose. In the alternative, various other coupling mechanisms may be employed to couple with a PVC pipe of an underground watering system or the like.

It should be understood that the foregoing components may be utilized to construct structures of any one of various configurations. One example of such structures is shown in FIG. 1. Such figure shows a trellis including a plurality of short pipes connected to form two vertical posts via interconnects. Such interconnects preferably comprises either the T or cross-shaped interconnects so that a plurality of horizontally oriented long pipes may be coupled between the vertical posts. It should be noted that an additional vertical post and more horizontally oriented posts may be coupled to the trellis if the cross-shaped interconnects are utilized. One of the open ends of the bottommost of the short pipes has caps secured thereon. During use, such caps reside underground such that the trellis is upstanding. As shown in FIG. 1, the water source connector is connected in linear alignment with a bottommost one of the long pipes. The trellis further includes an upper extent with pipes of an intermediate length coupled to the vertical posts and angled at a 45 degree angle and a V-shaped interconnect coupled between the pipes of intermediate length. The stopper may be employed to direct water through various selected pipes.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An expandable water trellis comprising, in combination:

a plurality of hollow pipes of various lengths each having a pair of open ends and a plurality of linearly aligned water dispensers formed along a length thereof, whereby upon the flow of water within the pipe, water is dispensed through the dispensers for watering purposes;

a plurality of caps each defined by a closed circular face with a periphery coupled thereto for defining an open top for removably securing about one of the open ends of one of the hollow pipes for selectively sealing the same;

a plurality of T-shaped interconnects each formed of a long tube with a pair of open ends and a short tube integrally coupled to a central extent of the long tube and extending perpendicularly therefrom thereby terminating in an open end which resides in fluidic communication with the open ends of the long tube, whereby each of the open ends is adapted to be releasably coupled to one of the open ends of one of the pipes in fluidic communication therewith;

a plurality of cross-shaped interconnects each formed of a pair of tubes having a pair of open ends, the pair of tubes integrally and perpendicularly coupled at central extents thereof with the open ends thereof in fluidic communication, whereby each of the open ends is adapted to be releasably coupled to one of the open ends of one of the pipes in fluidic communication therewith;

a plurality of 45 degree angle interconnects including a single tube with a pair of open ends, each 45 degree angle interconnect defined by a first extent and a second extent situated about an axis which resides at a 45 degree angle with respect to an axis encompassed by the first extent, whereby each of the open ends is adapted to be releasably coupled to one of the open ends of one of the pipes in fluidic communication therewith;

a plurality of 90 degree angle interconnects including a single tube with a pair of open ends, each 90 degree angle interconnect defined by a first extent and a second extent situated about an axis which resides at a 90 degree angle with respect to an axis encompassed by the first extent, whereby each of the open ends is adapted to be releasably coupled to one of the open ends of one of the pipes in fluidic communication therewith;

a plurality of elastomeric stoppers defined by a portion of a cylinder, each stopper adapted to be removably situated within the open ends of the pipes for precluding the flow of water therethrough;

a water source connector including a short tube having a pair of open ends, an annular flange integrally coupled to the tube adjacent one of the open ends thereof and extending radially outwardly therefrom, a sleeve having a hollow cylindrical configuration with an annular lip integrally coupled to an end thereof and extending radially inward and a plurality of threaded protrusions formed in an interior surface thereof, the sleeve rotatably coupled to the short tube of the water source connector for releasaby connecting to a water source, whereby the short tube is releasably coupleable with the interconnects for supplying a water flow to the pipes;

whereby a trellis may be constructed including a plurality of short pipes connected to form two vertical posts via interconnects which allow the coupling of a plurality of horizontally oriented long pipes therebetween, one of the open ends of bottommost one of the short pipes having caps secured thereon, the water source connector connected in linear alignment with a bottommost one of the long pipes, the trellis further including an upper extent with pipes of intermediate length coupled to the vertical posts and angled at a 45 degree angle and a V-shaped interconnect coupled between the pipes of intermediate length.

2. An expandable water trellis comprising:

a plurality of hollow pipes of various lengths each having a pair of open ends and a plurality of linearly aligned water dispensers formed along a length thereof, whereby upon the flow of water within the pipe, water is dispensed through the dispensers for watering purposes;

a plurality of caps for removably securing about one of the open ends of one of the hollow pipes for selectively sealing the same;

a plurality of T-shaped interconnects each formed of a long tube with a pair of open ends and a short tube integrally coupled to a central extent of the long tube and extending perpendicularly therefrom thereby terminating in an open end which resides in fluidic communication with the open ends of the long tube, whereby each of the open ends is adapted to be releasably coupled to one of the open ends of one of the pipes in fluidic communication therewith;

a plurality of elastomeric stoppers defined by a portion of a cylinder, each stopper adapted to be removably situated within the open ends of the pipes for precluding the flow of water therethrough; and a water source connector for releasaby connecting to a water source, whereby the water connector is releasably coupleable with the interconnects for supplying a water flow to the pipes.

3. An expandable water trellis as set forth in claim 2 wherein the interconnects are releasably coupled to the pipes by way of a frictional coupling.

4. An expandable water trellis as set forth in claim 2 wherein the water source interconnect includes a short tube having a pair of open ends, an annular flange integrally coupled to the tube adjacent one of the open ends thereof and extending radially outwardly therefrom, a sleeve having a hollow cylindrical configuration with an annular lip integrally coupled to an end thereof and extending radially inward and a plurality of threaded protrusions formed in an interior surface thereof, the sleeve rotatably coupled to the short tube of the water source connector.

5. An expandable water trellis as set forth in claim 2 whereby a trellis is constructed to include a plurality of short pipes connected to form two vertical posts via interconnects which allow the coupling of a plurality of horizontally oriented long pipes therebetween, one of the open ends of bottommost of the short pipes having caps secured thereon, the water source connector connected in linear alignment with a bottommost one of the long pipes.

6. An expandable water trellis as set forth in claim 2 and further including a plurality of cross-shaped interconnects defined by a pair of tubes having a pair of open ends, the pair of tubes integrally and perpendicular coupled at central extents thereof with the open ends thereof in fluidic communication, whereby each of the open ends is adapted to be releasably coupled to one of the open ends of one of the pipes in fluidic communication therewith.

7. An expandable water trellis as set forth in claim 2 and further including a plurality of 45 degree angle interconnects defined by a single tube with a pair of open ends, each 45 degree angle interconnect defined by a first extent and a second extent situated about an axis which resides at a 45 degree angle with respect to an axis encompassed by the first extent, whereby each of the open ends is adapted to be releasably coupled to one of the open ends of one of the pipes in fluidic communication therewith.

8. An expandable water trellis as set forth in claim 2 and further including a plurality of 90 degree angle interconnects formed of a single tube with a pair of open ends, each 90 degree angle interconnect defined by a first extent and a second extent situated about an axis which resides at a 90 degree angle with respect to an axis encompassed by the first extent, whereby each of the open ends is adapted to be releasably coupled to one of the open ends of one of the pipes in fluidic communication therewith.

* * * * *